(12) United States Patent
Shiraishi et al.

(10) Patent No.: US 6,550,444 B2
(45) Date of Patent: Apr. 22, 2003

(54) PREMIXED-COMPRESSION-IGNITION INTERNAL COMBUSTION ENGINE AND METHOD OF CONTROLLING THE SAME

(75) Inventors: Takuya Shiraishi, Hitachinaka (JP); Toshiharu Nogi, Hitachinaka (JP); Minoru Ohsuga, Hitachinaka (JP); Yoko Nakayama, Hitachi (JP); Noboru Tokuyasu, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/964,670

(22) Filed: Sep. 28, 2001

(65) Prior Publication Data

US 2002/0011233 A1 Jan. 31, 2002

Related U.S. Application Data (63) Continuation of application No. 09/258,880, filed on Feb. 25, 1999, now abandoned.

(30) Foreign Application Priority Data

Mar. 9, 1998 (JP) .............................. 10-56413

(51) Int. Cl.$^7$ .............................. F02D 41/14; F02B 3/00
(52) U.S. Cl. ..................... 123/294; 123/90.11; 123/295
(58) Field of Search ................. 123/294, 295, 123/299, 300, 90.11, 90.12, 90.13, 90.15, 90.16, 435, 436, 480

(56) References Cited

U.S. PATENT DOCUMENTS

| | | | | |
|---|---|---|---|---|
| 4,009,695 A | * | 3/1977 | Ule | 123/90.12 |
| 4,111,177 A | * | 9/1978 | Regueiro | 123/295 |
| 4,633,403 A | * | 12/1986 | Asmus | 123/90.16 |
| 6,155,217 A | * | 12/2000 | Shiraishi et al. | 123/90.15 |
| 6,371,065 B1 | * | 4/2002 | Shiraishi et al. | 123/90.15 |

FOREIGN PATENT DOCUMENTS

| | | | | |
|---|---|---|---|---|
| JP | 4-8847 | * | 1/1992 | F02D/41/34 |
| JP | 11-257108 | * | 9/1999 | F02D/13/02 |

* cited by examiner

*Primary Examiner*—Hieu T. Vo
(74) *Attorney, Agent, or Firm*—Crowell & Moring LLP (57) ABSTRACT

An object of the present invention is to provide a compression-ignition internal combustion engine capable of improving its engine performance by appropriately setting ignition timing.

In order to attain the above-mentioned object, the compression-ignition internal combustion engine comprises a valve mechanism control means for controlling opening and closing timings of a valve mechanism including an intake valve and an exhaust valve arranged in a cylinder of the internal combustion engine. Using the valve mechanism control means, the compression pressure can be controlled corresponding to an operating condition of the engine, and accordingly the auto-ignition timing can be controlled correspondingly to the operating condition of the engine.

10 Claims, 12 Drawing Sheets

PREMIXED-COMPRESSION-IGNITION INTERNAL COMBUSTION ENGINE AND METHOD OF CONTROLLING THE SAME

This application is a continuation of application Ser. No. 09/258,880, filed Feb. 25, 1999, now abandoned.

BACKGROUND OF THE INVENTION

The present invention relates to an auto-ignition type internal combustion engine and contrail method particularly to an apparatus and a method of controlling ignition timing in an auto-ignition type internal combustion engine.

Japanese Patent Application Laid-Open No. 7-332140 and Japanese Patent Application Laid-Open No. 7-150948 propose a gasoline engine in which a premixed mixture in a combustion chamber is automatically ignited by increasing the compression ratio higher than a common compression ratio without using any spark plug.

This auto-ignition type engine has merit in that its pumping loss is so little as to improve its efficiency at low load operation because the engine has no throttle valve which is used in a common gasoline engine in order to control a quantity of intake air. The load controlling method at that time is performed by controlling the fuel injecting rate similar to that in a diesel engine, and the ignition of the mixture is performed by the auto-ignition caused by the effect of the compression ratio set to a value higher than the common value.

In a case of spark plug ignition, $NO_x$ is apt to be exhausted because a high temperature portion is locally formed. However, the auto-ignition takes place at many points not just a single point. As a result, the mixture is ignited and burned at many points as if many spark plugs were arranged in the combustion chamber, and the engine has accordingly an advantage that the NO exhaust concentration can be lowered to several ppm because no local high temperature portion cannot be formed in the combustion chamber.

In the above referent embodiment, it is described timing to inject fuel to the intake port is set from 10 degrees before timing of closing the intake valve to 110 degrees before timing of opening the intake valve, amount of fuel directly injected into the combustion chamber is set to 15 to 25% of the total amount of the injected fuel, and the injecting timing is set to 8 to 30 degrees before the top dead center.

The compression-ignition internal combustion engine described above is expected as a next generation vehicle engine which can satisfy low fuel consumption and low emission at one time. However, the intake air flow rate and the fuel flow rate are changed every cycle. The change in air flow rate is caused by surge inside the intake pipe and difference in intake air flow rate distribution among the cylinders. In the intake port injection engine, the change in fuel flow rate is caused by the fact that fuel attached onto the wall surface inside the intake port is supplied to the combustion chamber in delaying over several combustion cycles.

Therefore, the problem of the change in fuel flow rate can be solved to a certain degree by directly injecting the fuel into the cylinder. However, it is impossible to eliminate, for example, the change in air flow rate to each of the cylinders due to difference in length of the intake pipe or the change in air flow rate due to difference in shape of the intake passage.

In the compression-ignition engine, the ignition phenomenon is caused by increase in temperature and pressure of the air or the mixture compressed by the engine, and the occurrence timing of the ignition phenomenon must be singly determined to a value when the temperature, the pressure and the air-to-fuel ratio are kept constant. However, the ignition timing is changed every cycle due to the cyclic changes in air flow rate and fuel flow rate described above. The change in ignition timing relates to change in generated torque to causes ands vibration of the engine.

Accordingly, it is preferable that the ignition timing is kept constant or the changing width of the ignition timing is kept small when the operating condition is constant. Further, a non-throttle engine is apt to be affected by an effect of pressure change due to atmospheric pressure change or altitude difference. Therefore, in the compression-ignition internal combustion engine, it is insufficient from the viewpoint of controlling the ignition timing to control only the injection timing and the injection flow rate of fuel.

SUMMARY OF THE INVENTION

In order to solve the above-mentioned problem, a first object of the present invention is to improve a compression-ignition internal combustion engine by properly controlling auto-ignition timing of the engine.

In order to attain the above-mentioned object, a compression-ignition internal combustion engine in accordance with the present invention comprises a valve control means for controlling opening timing and/or closing timing of the intake valve and/or the exhaust valve.

By controlling opening timing and/or closing timing of valves, it is possible to control the compression pressure corresponding to an operating condition of the engine, and to obtain an appropriate auto-ignition timing because the auto-ignition timing can be controlled corresponding to the operating condition of the engine.

Since a crank angle corresponding to combustion time period becomes large when a rotating speed of the engine is high, it is also important to control opening timing and/or closing timing of the intake valve and/or the exhaust vale corresponding to the rotating speed of the engine so that the auto-ignition occurs at an appropriate timing.

Since combustion speed becomes slow when an air-to-fuel ratio is increased, it is important to control opening timing and/or closing timing of the intake valve and/or the exhaust vale corresponding to the air-to-fuel ratio so that the auto-ignition occurs at an appropriate timing.

It is practical that the control of auto-ignition timing is performed so as to minimize a difference between an actual ignition timing and a target ignition timing by comparing them.

When the air-to-fuel ratio becomes larger than a preset value or when the rotating speed of the engine becomes higher than a preset value, an appropriate combustion can be attained by controlling the opening timing and/or the closing timing of the intake valve and/or the exhaust valve so that the auto-ignition timing or the maximum point of the cylinder pressure falls within 20 degrees after the top dead center.

DESCRIPTION OF THE PREFERRED EMBODIMENTS

An embodiment of the preset invention will be described below, referring to the accompanied drawings. To simplify, an embodiment about the engine which has one cylinder will be described below. It is needless to say, the present invention is applicable an engine having plural cylinders.

Figure 1:
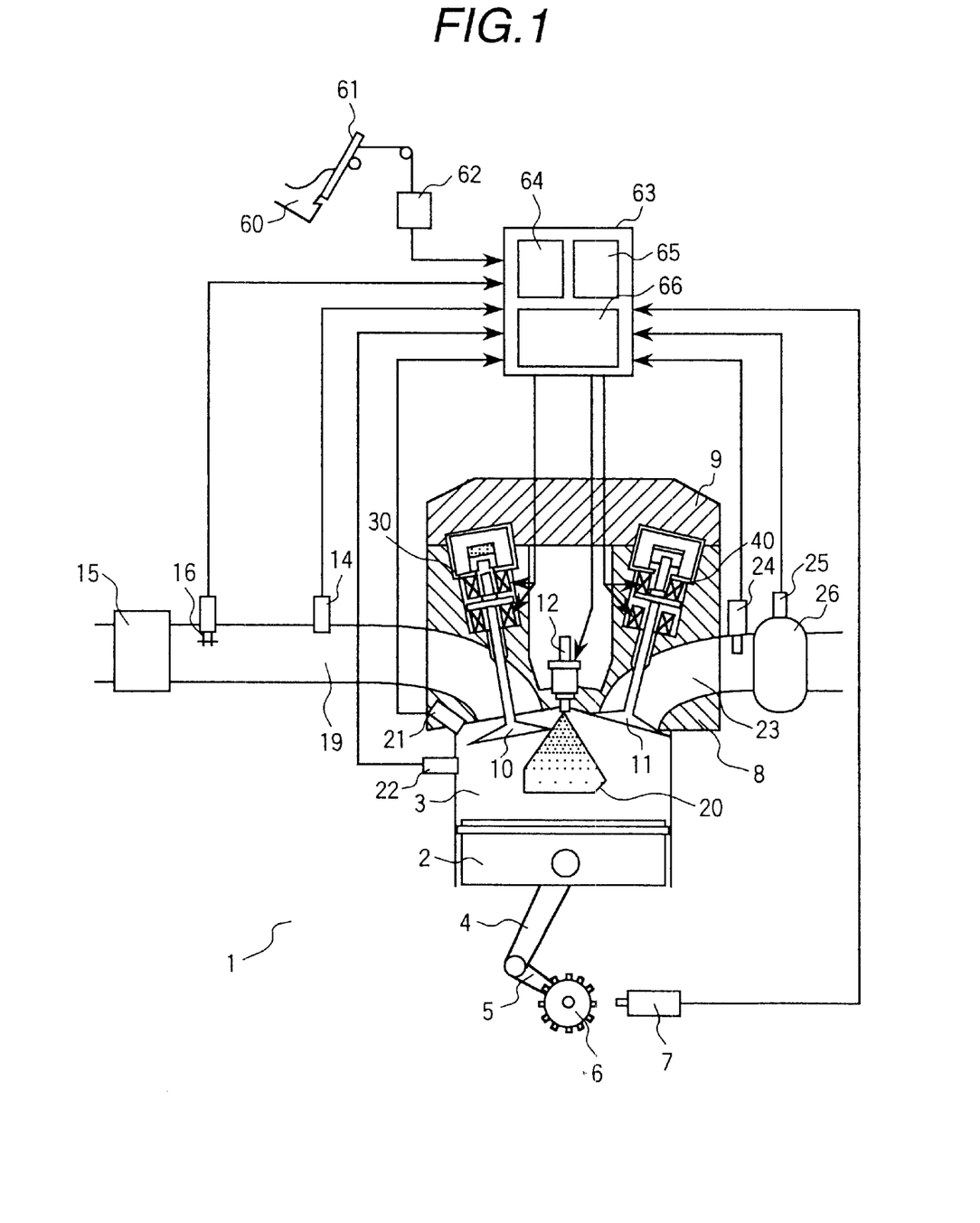
FIG. 1 is a diagram showing the system of a direct injection engine of center injection type to which the present invention is applied.

An internal combustion engine 1 shown in FIG. 1 comprises a crank mechanism composed of a connecting rod 4 and a crank shaft 5, and a combustion chamber 3 is formed of a piston 2 linked top the crank mechanism and an engine head 8 of the engine 1. The combustion chamber 3 is enclosed by an intake valve 10, an exhaust valve 11 and a fuel injector 12 attached onto the engine head 8. The intake valve 10 and the exhaust valve 11 are operated by variable valve mechanisms 30, 40. The engine 1 sucks air necessary for combustion into the combustion chamber 3 by reciprocal motion of the piston 2. The air to be sucked into the engine 1 is cleaned by removing dust and extraneous particles contained in the air using an air cleaner 15, and an intake flow rate of the air to be a base for calculating a fuel injection rate is measured using an air flow sensor 16.

A control unit 63 for controlling the engine 1 comprises an operating condition detecting means 66 for detecting an operating condition of the engine 1 based on signals from various kinds of sensors, a variable valve control means 64 for controlling operation of the variable valve mechanisms 30, 40 attached onto the engine 1, and a fuel injection control means 65 for controlling for controlling an amount of fuel to be injected from the fuel injector 12 and the injection timing.

An operating amount of an acceleration pedal 61 operated by a driver 60 of a vehicle mounting the engine 1 is converted into an electric signal using a potentiometer 62, and input to the operating condition detecting means 66 in the control unit 63. Other signals to be input to the operating condition detecting means are, for example, signals from crank sensors 6, 7 attached to the crank shaft 5, from the air flow sensor 16 described above, from an intake pipe pressure sensor 14, from an air-to-fuel ratio sensor 24 attached to the exhaust pipe 23, from a temperature sensor 25 for detecting temperature of an exhaust gas catalyzer, from a pressure sensor 21 for detecting pressure inside the combustion chamber 3 attached to the combustion chamber 3, and from a knock sensor 22 for detecting knocking.

The variable valve control means 64 outputs a control signal to the variable valve mechanism 30 for operating the intake valve 10 based on a signal from the operating condition detecting means 66.

The fuel injection control means 65 outputs a control signal to the fuel injector 12 based on a signal from the operating condition detecting means 66 to adjust the fuel injection amount and the injection timing. Fuel spray injected into the combustion chamber 3 is sufficiently mixed with the air in the cylinder to form a homogeneous mixture. The intake valve 10 is closed at a timing determined according to a control signal from the variable valve control means 64.

As load control methods of an internal combustion engine, there are two methods, that is, a method that an intake air flow rate is controlled corresponding to a load and an amount of fuel corresponding to the intake air flow rate is supplied, and a method that an amount of fuel is supplied corresponding to a load but an intake air flow rate is not regulated.

The difference between the methods comes from a property (so-called, ignitability) of fuel used, and the former corresponds to a case of gasoline engine, and the latter corresponds to a case of a diesel engine. It is said that the diesel engine generally has a good fuel efficiency. The reason is that no pumping loss occurs in the diesel engine because the intake air flow rate is not throttled. On the other hand, since the load control is performed by the intake air flow rate, the gasoline engine has a throttle valve in the middle of the intake pipe for necessity of throttling the air flow rate at a low load. Therefore, pressure in the intake port downstream of the throttle valve becomes a negative pressure which is lower than atmospheric pressure. Since the pressure in the combustion chamber after completion of the exhaust stroke is almost atmospheric pressure, the upstream of the intake valve (the intake port side) is in a negative pressure and the downstream (the combustion chamber side) is in atmospheric pressure at the beginning of the intake stroke. In order to let air flow from the intake port side to the combustion chamber side, the air must be sucked by downward motion of the piston and accordingly the engine must perform work to suck the air. This work is negative work to the engine, and is called as a pumping loss.

Thereby, in the gasoline engine, since an opening degree of the throttle valve at a low and medium load is small and the pumping loss is always produced, the fuel efficiency becomes low. As a technology to reduce the pumping loss, a lean burn method, in which the same amount of fuel is burned by increasing an amount of air, has been proposed and practically used. This technology has been firstly applied to the intake port injection engine (hereinafter, referred to as MPI).

In a case of the MPI, the stable combustion limit is approximately 25 on the basis of air-to-fuel ratio because a homogeneous mixture is easily formed in the combustion chamber. After that, the technology has been applied to a direct injection engine (hereinafter, referred to DI) in which a stratified mixture is easily formed in the combustion chamber, and the stable combustion limit is approximately 40 to 50 on the basis of air-to-fuel ratio.

In the lean burn method having the combustion mode of igniting and propagating using a spark plug as described above, the fuel efficiency is insufficient because the pumping loss is produced in the operating range controlled using the throttle valve due to the limitation of air-to-fuel ratio described above.

The compression ignition means that temperature of a mixture of air and fuel is increased by compressing the mixture and then the mixture is automatically ignited. The temperature at ignition is determined by a concentration of the mixture. The compression-ignition combustion is characterized by that the ignition occurs at many points but not at a single point. Therefore, it is sufficient that flame is propagated in a very short distance near an ignition point, and accordingly the combustion speed becomes fast when the combustion is observed from the view point of the whole combustion chamber. Further, $NO_x$ discharge can be reduced to an extremely small value because there is formed no local high temperature point, which is different from a case of the stratified combustion where combustion is performed by igniting at a single point.

Figure 2:
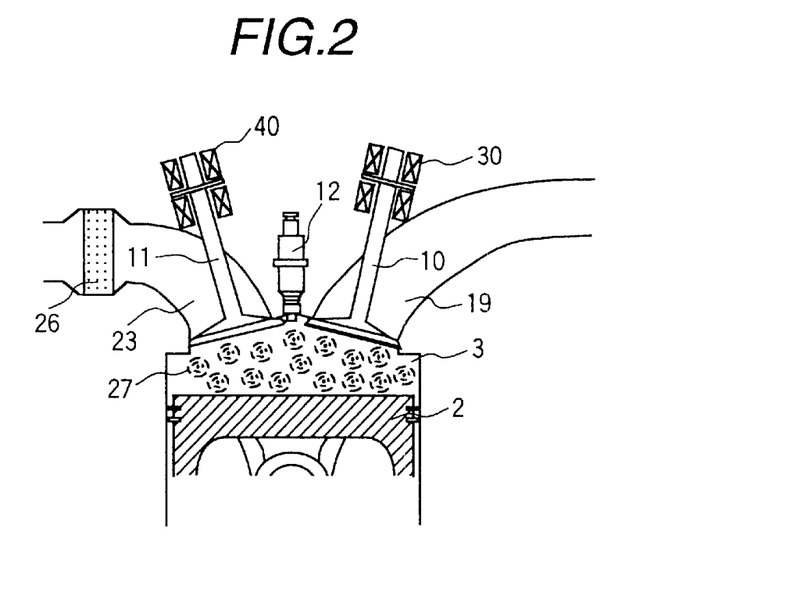
FIG. 2 is a view showing a combustion state when compression-ignition combustion is applied to an engine.

FIG. 2 shows an example in which the combustion mode is applied to a vehicle gasoline engine. The mixture in the combustion chamber 3 is compressed by the piston 2 to increase the temperature and the pressure, and starts to be ignited and burned when the pressure exceeds a certain value. Since this ignition phenomenon occurs at everywhere in the combustion chamber 3, the combustion propagating distance required for each of ignition points 27 is short and accordingly the combustion speed is faster than that of the common combustion by flame propagation.

Further, the fuel burns with involving burned gas near each of the combustion points (internal EGR), the combustion temperature becomes lower and consequently the $NO_x$ discharge concentration becomes extremely low (hereinafter, referred to as low $NO_x$ combustion). In addition to these, since the embodiment of the present invention shown in FIG. 1 has no throttle valve, the pumping loss at the intake stroke is not produced and accordingly there are effects in high efficiency and in high fuel efficiency.

There is a relationship between temperature and pressure expressed by the following equation (equation of state for gas).

$$PV=nRT \quad (1)$$

where P is pressure, V is volume, n is mole number of gas, R is gas constant, and T is temperature. Therefore, a temperature can be calculated from Equation (1) when a pressure is given. In a field of engine control, it is common to employ pressure measurement rather than temperature measurement. Therefore, pressure is employed in the explanation to be described below.

Figure 3:
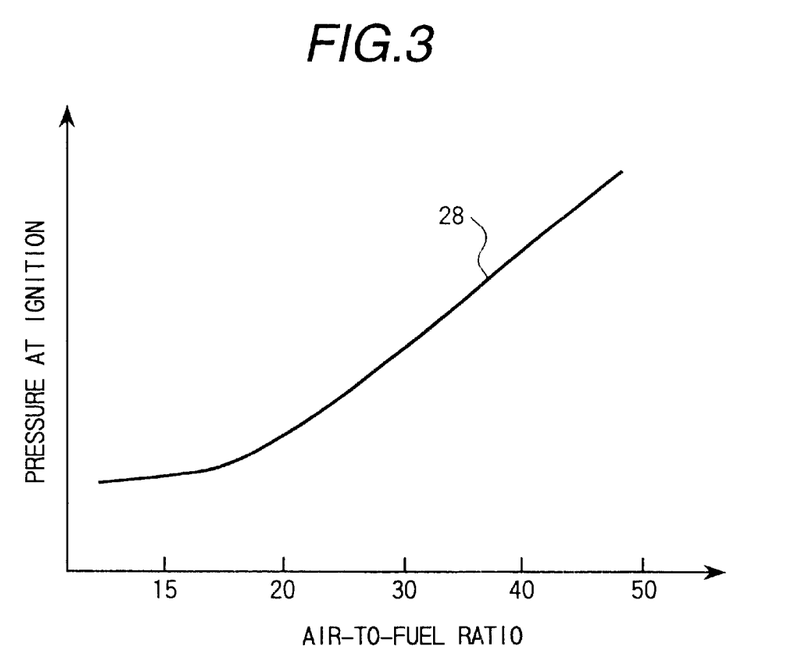
FIG. 3 is a diagram showing the relationship between air-to-fuel ratio A/F and pressure at ignition Pcr.

Letting a pressure at occurrence of ignition be Pcr, Pcr is determined by a fuel concentration in a mixture, that is, an air-to-fuel ratio A/F. FIG. 3 shows the relationship between air-to-fuel ratio A/F and pressure at ignition Pcr. As shown by a solid line 28, ignition occurs at relatively low pressure when the air-to-fuel ratio is small, but ignition pressure becomes high when the air-to-fuel ratio is large.

Figure 4:
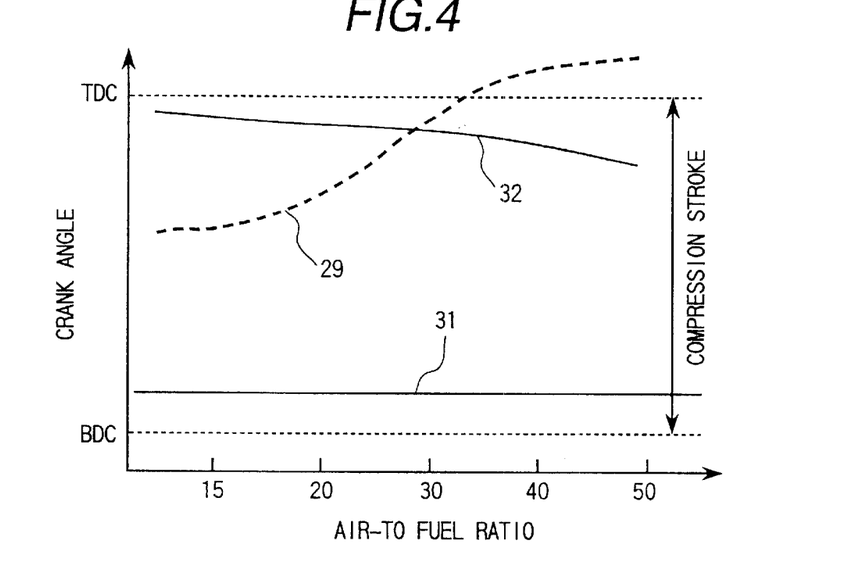
FIG. 4 is a diagram showing ignition timing when opening and closing timings of an intake and an exhaust valves are fixed.

In order to apply the compression ignition to an engine, it is necessary that ignition timing can be controlled even if the mixture is changed from a dense air-to-fuel ratio to a lean air-to-fuel ratio. In an engine having a valve drive mechanism in which the opening and closing timings of the intake and the exhaust valves are determined by a preset cam, compression pressure in each cycle is always constant and accordingly the ignition timing becomes inappropriate when the air-to-fuel ratio is changed. FIG. 4 shows ignition timing when a valve drive mechanism is combined with a compression-ignition engine. A dot line 32 shows an ideal ignition timing. However, as shown by a solid line 29, ignition occurs earlier when the air-to-fuel ratio is small, and ignition occurs later or does not occur when the air-to-fuel ratio is large. Therefore, a key point of the present invention is to make ignition at appropriate timing by controlling compression pressure.

The engine 1 compresses the mixture when the piston 2 is being moved from the bottom head center (BDC) to the top dead center (TDC). The compression pressure can be controlled by adjusting the closing timing of the intake valve 10. The compression pressure control using a variable valve will be described below, referring to FIG. 5. The abscissa indicates crank angle of the engine, and one cycle (intake—compression—expansion—exhaust strokes) is completed by two rotations (720 degrees). The ordinate indicates pressure in the cylinder. Since the compression-ignition internal combustion engine in accordance with the present invention has no throttle valve, the pressure during the intake stroke becomes nearly atmospheric pressure because of no intake throttle.

Figure 5:
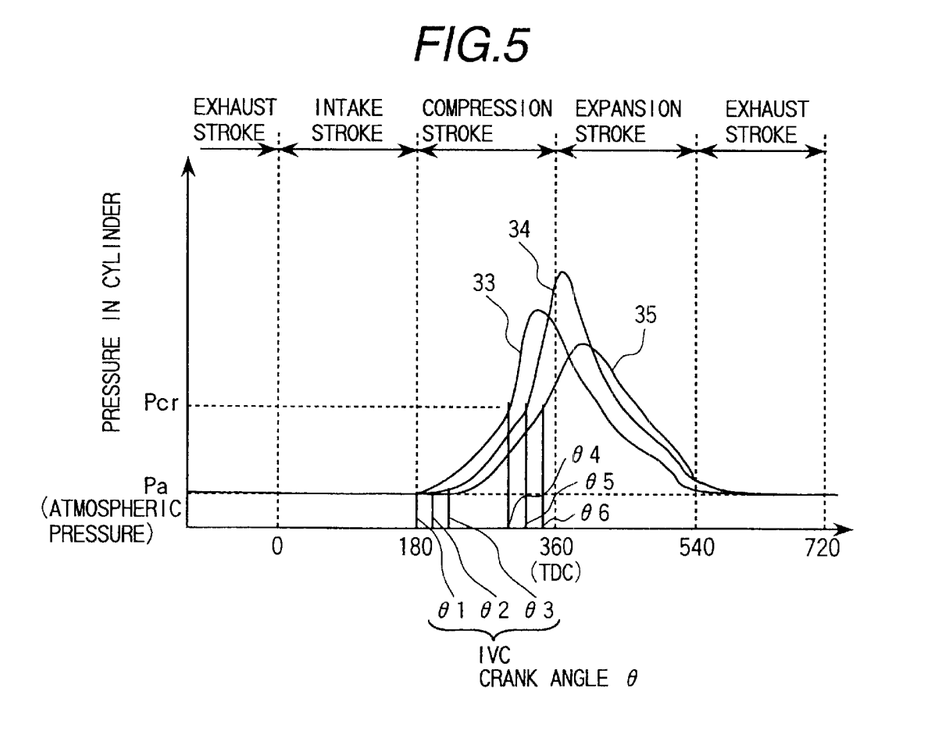
FIG. 5 is a diagram showing compression pressure control using a variable valve.

When the A/F is constant, a pressure Pcr at occurrence of ignition can be determined from FIG. 3. The mixture is started to be compressed when the intake valve 10 is closed (hereinafter, referred to as IVC) to increase the pressure in cylinder. In a case where the IVC is set to θ1, the mixture is compressed as shown by the line 33, and ignited and burned at θ4 to increase the pressure in cylinder. However, since the crank angle where the pressure in cylinder becomes maximum is before the TDC (360 degrees), the pressure rise caused by combustion interrupts the upward motion of the piston 2. That is pre-ignition.

In a case where the IVC is set to θ2, the mixture is compressed as shown by the line 34, and ignited at θ5. If the pressure in cylinder after combustion becomes maximum within 20 degrees after TDC (360 degrees), and ideal combustion can be attained. However, when the IVC is delayed up to θ3, the mixture is compressed and the actual compression ratio is reduced as shown by the line 35. The ignition timing becomes at θ6, and combustion occurs during the expansion stroke. In this case, since the pressure is increased by combustion at the time when the piston 2 is started to be moved downward, the mixture is apt to be burned incompletely. Further, the exhaust temperature becomes high. As described above, an optimum ignition timing can be attained by controlling the IVC.

Figure 6:
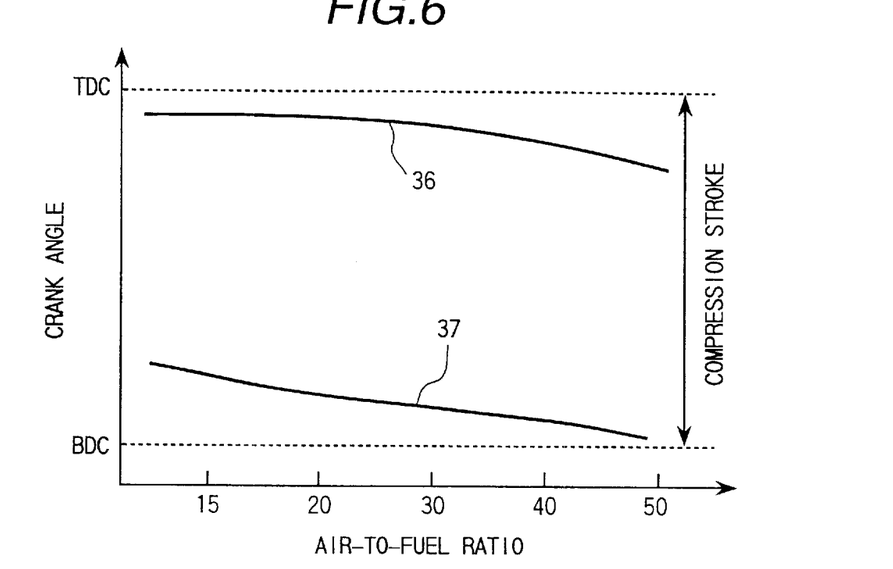
FIG. 6 is a diagram showing the relationship between target ignition timing and IVC when an air-to-fuel ratio is varied.

FIG. 6 shows the relationship between target ignition timing and IVC when the air-to-fuel ratio is varied. The ordinate indicates compression stroke from the bottom dead center (BDC) to the top dead center (TDC). A case where the engine rotating speed is kept constant will be described below. Since the combustion speed is relatively fast when the air-to-fuel ratio is small, the target ignition timing is set to a position near the TDC as shown by the solid line 36 so that the pressure in cylinder becomes the maximum value within 20 degrees after the TDC (360 degrees). Since the combustion speed is relatively slow when the air-to-fuel ratio is large, the target ignition timing is set to a position considerably before the TDC so that the pressure in cylinder becomes the maximum value within 20 degrees after the TDC (360 degrees).

When the target ignition timing is set as described above, an IVC is determined as shown by the solid line 37 in taking an amount of compression pressure rise into consideration so that the pressure in cylinder becomes the pressure at ignition Pcr corresponding to the air-to-fuel shown in FIG. 3.

The compression pressure can be calculated assuming the compression stroke to be a polytropic change. In other words, a predetermined target ignition timing and a pressure at ignition Pcr are determined from an air-to-fuel ratio corresponding to each operating condition, and an IVC is determined so that the pressure of the mixture sucked into the combustion chamber is increased up to the pressure at ignition Pcr by the target ignition timing.

Figure 7:
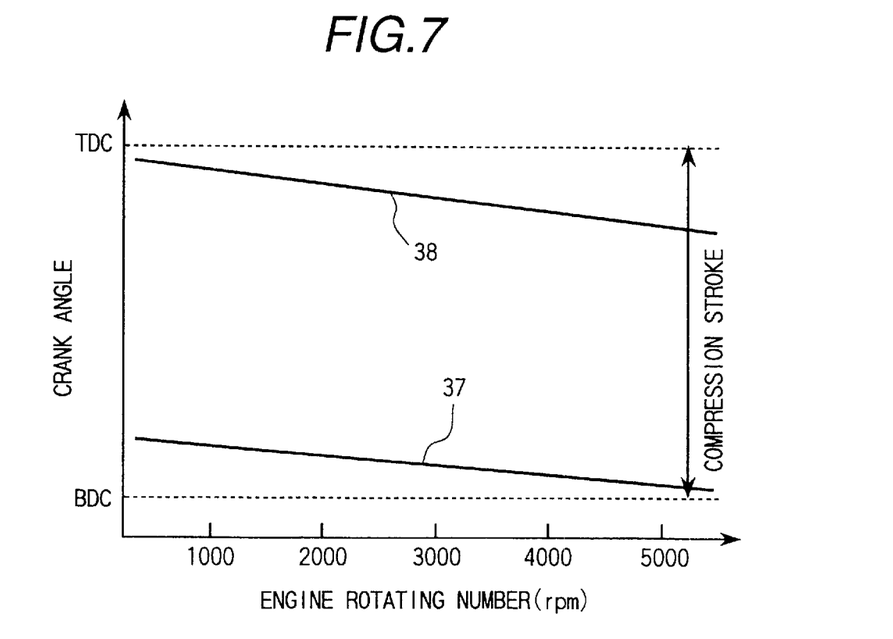
FIG. 7 is a diagram showing the relationship between target ignition timing and IVC when a rotating speed of engine is varied.

FIG. 7 shows target ignition timing and IVC when engine rotating number is varied. The ordinate indicates compression stroke from the bottom dead center (BDC) to the top dead center (TDC). A case where the air-to-fuel ratio is kept constant will be described below. Since the air-to-fuel ratio is kept constant, the pressure at ignition Pcr and the combustion speed are not changed. However, when the rotating number is increased, the crank angle corresponding to combustion time becomes large. Therefore, the target ignition timing is set in the advanced side than the TDC as shown by the solid line 38.

When the target ignition timing is set as described above, an IVC is determined as shown by the solid line 39 in taking an amount of compression pressure rise into consideration so that the pressure in cylinder becomes the pressure at ignition Pcr corresponding to the air-to-fuel shown in FIG. 3.

The compression pressure can be calculated assuming the compression stroke to be a polytropic change. In other words, a predetermined target ignition timing and a pressure at ignition Pcr are determined from an air-to-fuel ratio corresponding to each operating condition, and an IVC is determined so that the pressure of the mixture sucked into the combustion chamber is increased up to the pressure at ignition Pcr by the target ignition timing.

This relation can be expressed by the following equation.

$$V(\theta IVC)=V(\theta m)*(Pcr/Pa)\hat{\ }(1/n) \quad (2)$$

where $V(\theta IVC)$ is cylinder volume at IVC, $V(\theta m)$ is cylinder volume at target ignition timing, Pcr is pressure at ignition, Pa is atmospheric pressure, and n is polytropic coefficient. Since the cylinder volume can be calculated using a crank angle, and a bore, a stroke and a length of connecting rod of the engine, there is a one-to-one corresponding relationship between the cylinder volume and the crank angle.

Figure 8:
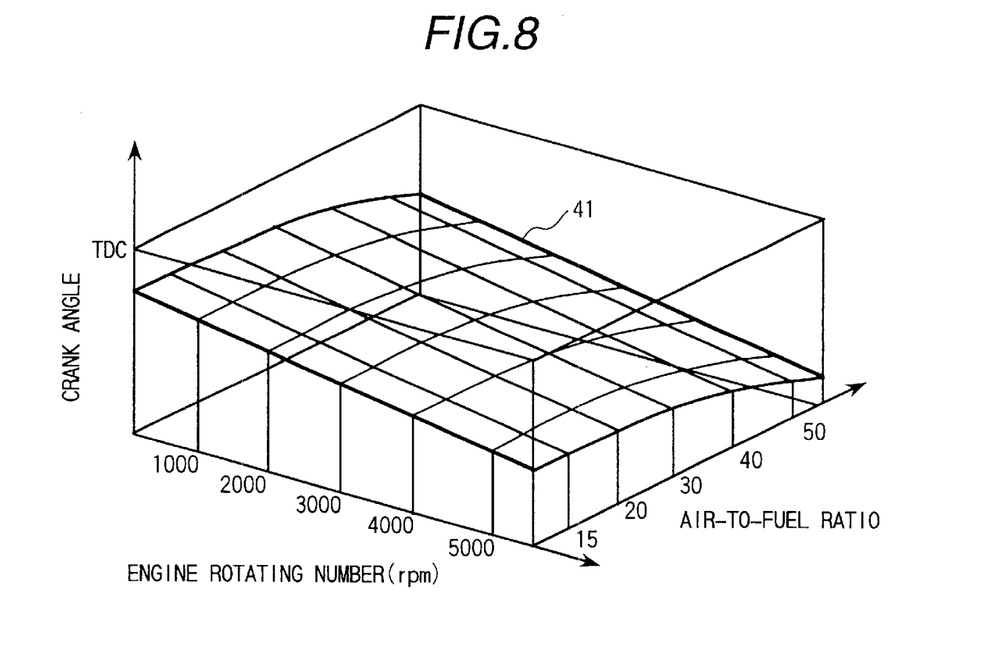
FIG. 8 is a view showing a three-dimensional map of target ignition timing when an air-to-fuel ratio and a rotating speed of engine are varied.
Figure 9:
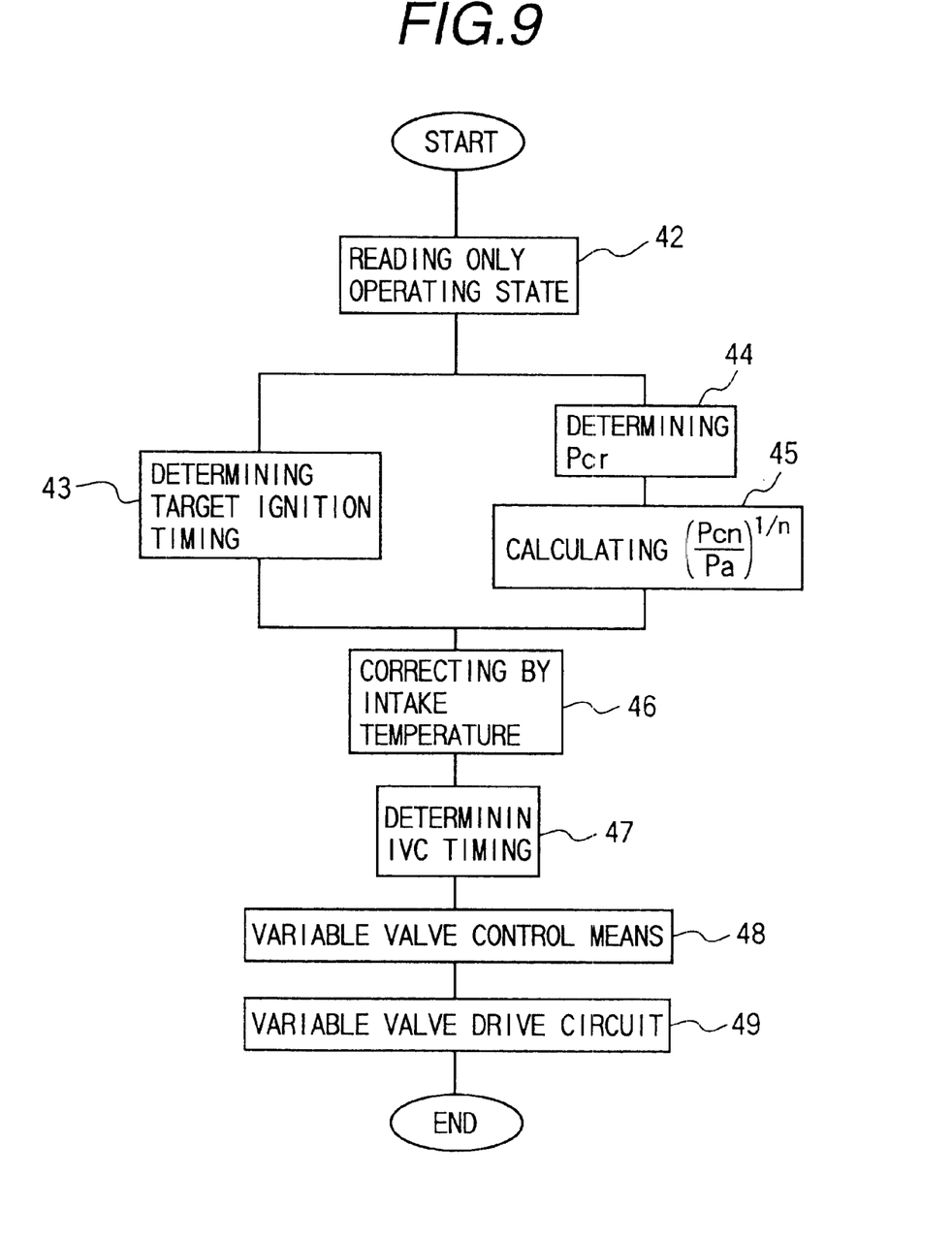
FIG. 9 is a flowchart showing an embodiment of control in the present invention.

FIG. 8 shows a target ignition timing map when the air-to-fuel ratio and the rotating number are varied. Further, FIG. 9 shows a flowchart of ignition timing control using a variable valve. The operating condition detecting means 66 in the control unit 63 of the engine 1 detects an operating condition of the engine 1 based on signals from the various kinds of sensors in the block 42, and determines a target ignition timing θm suitable for the operating condition of the engine 1 in the block 43.

The reference character 41 in FIG. 8 indicates the target ignition timing θm. Further, in the block 44, a Pcr is determined at the same time. Here, the pressure at ignition Pcr is determined from an air-to-fuel ratio A/F of a mixture, and the target ignition timing θm is determined from the air-to-fuel ratio and an engine rotating number. The Pcr and the θm are pre-stored in a ROM of the control unit, and it can be considered that they are determined by feeding an exhaust gas air-to-fuel ratio or the supplied air-to-fuel ratio back to the control unit. Next, in the block 45, a value $(Pcr/Pa)\hat{\ }(1/n)$ is calculated, and an amount of pressure rise until the target ignition timing is calculated, and an IVC timing is temporarily determined based on the value and the amount of pressure rise.

Since the three-dimensional map shown in FIG. 8 is data based on the standard atmospheric state, the temporary IVC timing is corrected by an intake temperature in the block 46.

Figure 10:
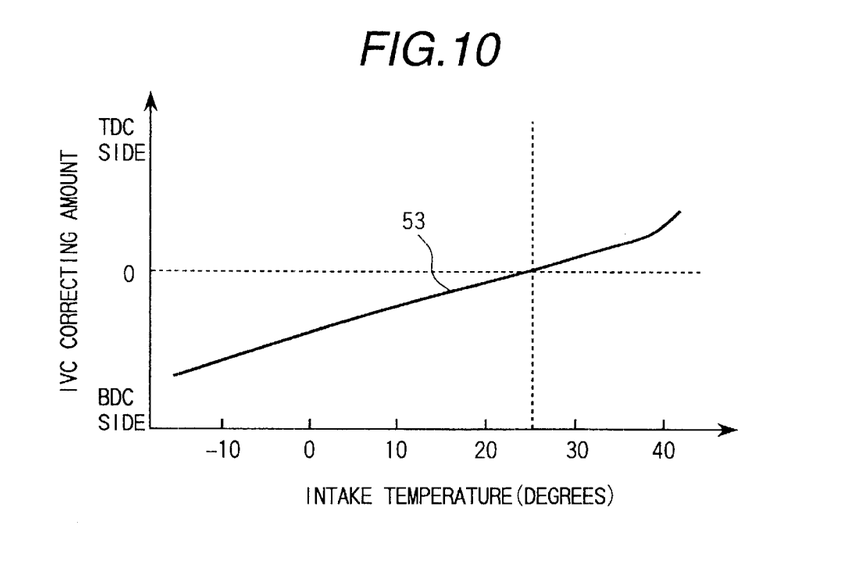
FIG. 10 is a diagram showing the relationship between intake temperature and IVC correcting amount.

FIG. 10 shows the relationship between intake temperature and IVC correcting amount. Since temperature in cylinder after compression is not sufficiently increased when the intake temperature is low, the compression stroke is lengthened by correcting to the BDC side as shown by the solid line 53. Since temperature in cylinder after compression is excessively increased when the intake temperature is high, the compression stroke is shortened by correcting to the TDC side. In the block 46 an IVC timing is finally determined, and in the block 48 the command value is transmitted to the variable valve control means 64 to operate the variable valve 30 through the variable valve drive circuit.

Figure 12:
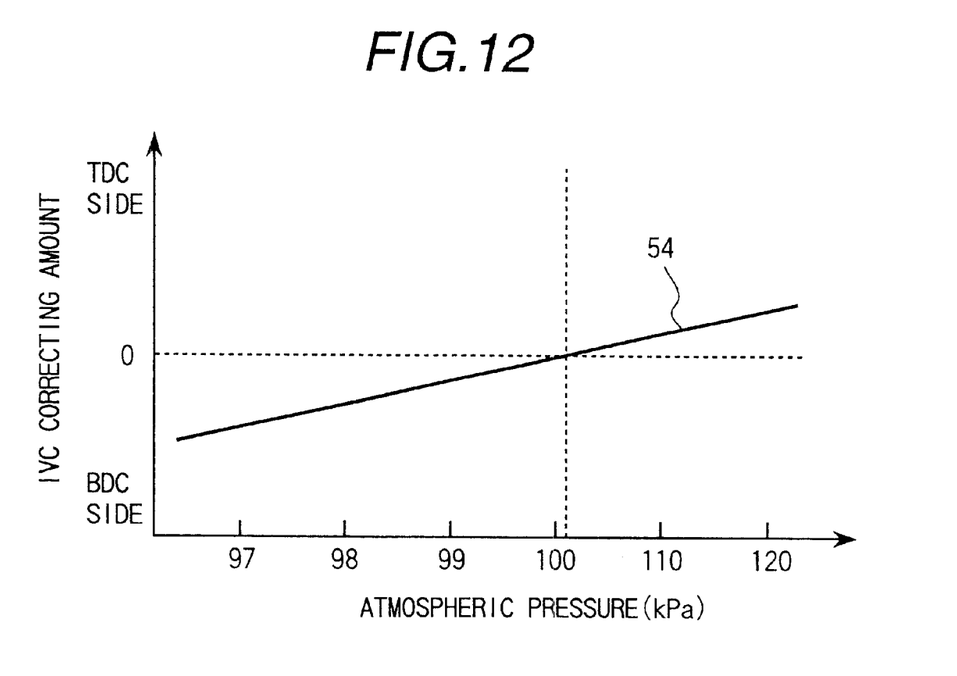
FIG. 12 a diagram showing the relationship between atmospheric pressure and IVC correcting amount.

In the calculation of the value $(Pcr/Pa)\hat{\ }(1/n)$ in the block 45 of FIG. 9, it is possible that only a value $(Pcr)\hat{\ }(1/n)$ is calculated in the block 45 and the correction of atmospheric pressure is performed in the block 50, as shown in FIG. 12. As shown by the silid line 54, the compression stroke is lengthened by correcting to the BDC side when the intake temperature is low, and the compression stroke is shortened by correcting to the TDC side when the intake temperature is high.

Figure 11:
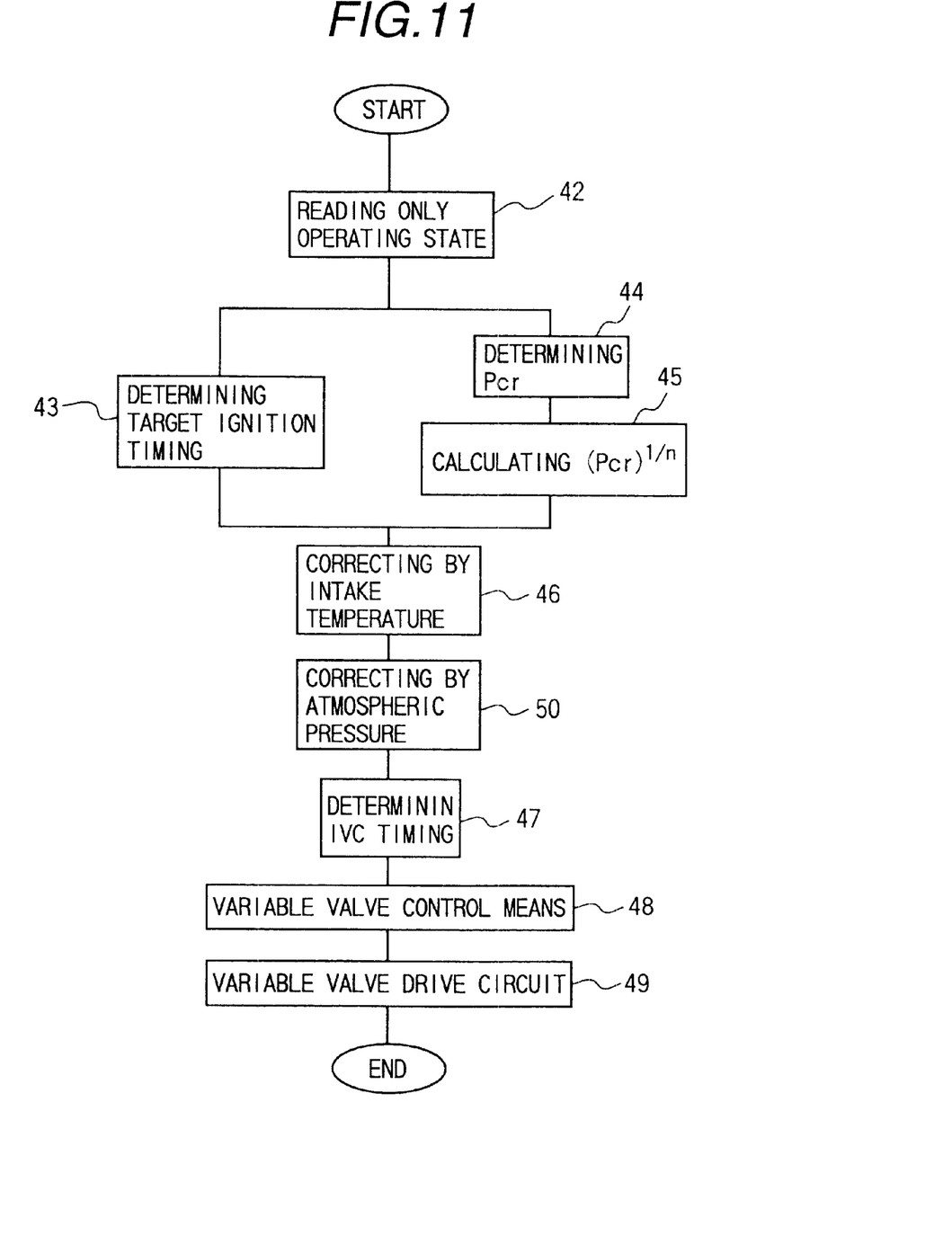
FIG. 11 is a flowchart showing a second embodiment of control in the present invention.
Figure 13:
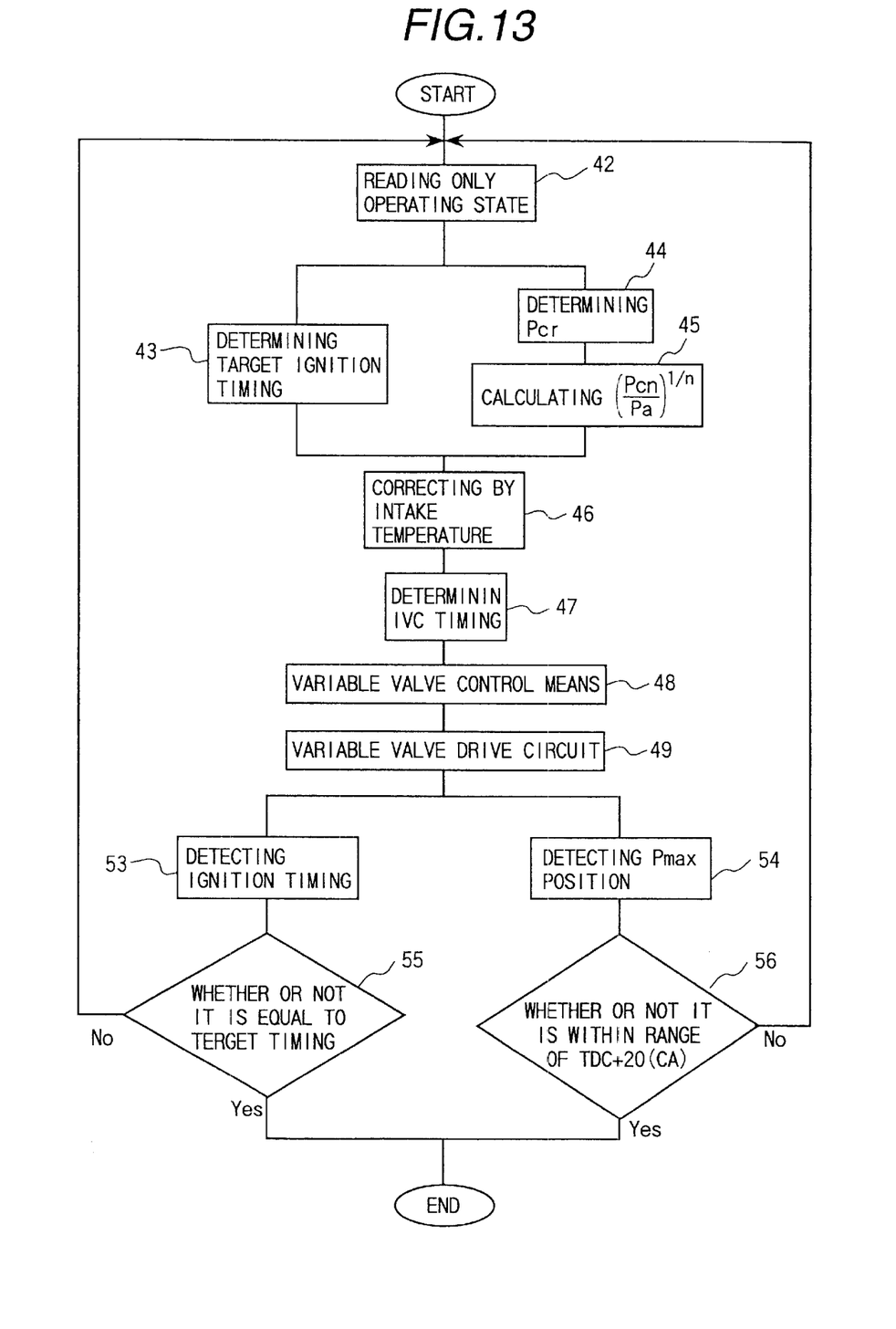
FIG. 13 is a flowchart showing a third embodiment of control flowchart in the present invention.

FIG. 13 shows a flowchart of ignition timing control using the variable valve when the engine has a cylinder pressure sensor. The control process before determining the IVC and operating the variable valve is the same as that of FIG. 9 or FIG. 11. In a case where the engine has the combustion pressure sensor 21 as the cylinder pressure sensor, in the block 53 an ignition timing is detected from a pressure rise by ignition and combustion, and in the block 55 the detected ignition timing is compared with the target ignition timing θm. If there is difference between them, the processing is repeated from the start to correct the ignition timing.

On the other hand, in the block 54 a crank angle showing the maximum combustion pressure (Pmax) is detected, and in the block 56 it is judged whether or not the detected crank angle is within a normal combustion range of TDC +20 degrees. If it is outside of the range, the processing is repeated from the start to correct the ignition timing. Such a difference in the ignition timing is apt to occur in a transient period such as an acceleration period. The system having the combustion pressure sensor 21 as the cylinder pressure sensor and the variable valve 30 is good in response and in controllability because the correction can be reflected on the cycle just next to the cycle detecting the difference in ignition timing.

Figure 14:
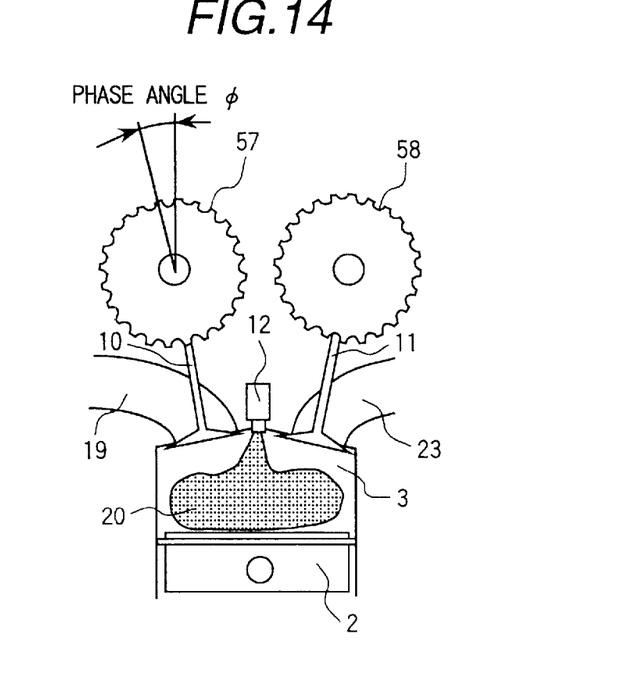
FIG. 14 is a view showing another variable valve mechanism which can be applied to the present invention.
Figure 15:
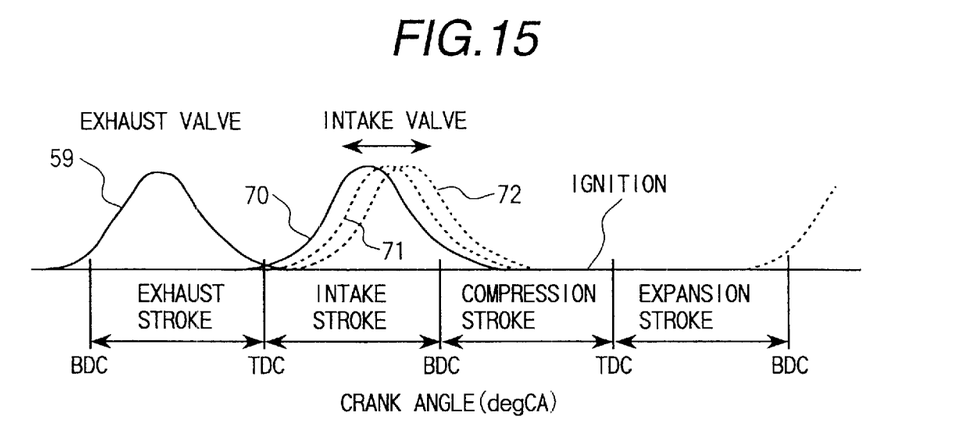
FIG. 15 is a chart showing valve lifting in another variable valve mechanism which can be applied to the present invention.

Instead of the variable valve mechanism shown in the present embodiment, it is possible to use a variable valve mechanism in which a cam shaft is rotated by varying a phase angle Φ of a cam pulley 57 as shown in FIG. 14. It's not necessary to vary a phase angle of a cam pully 58 of exhaust side. In the variable valve mechanism of the phase type, the intake valve closing timing is adjusted by changing the valve lift phase of the intake valve 10 as shown by 70, 71, 72 in FIG. 15. The exhaust valve timing is not changed as shown by 59 in FIG. 15.

Figure 16:
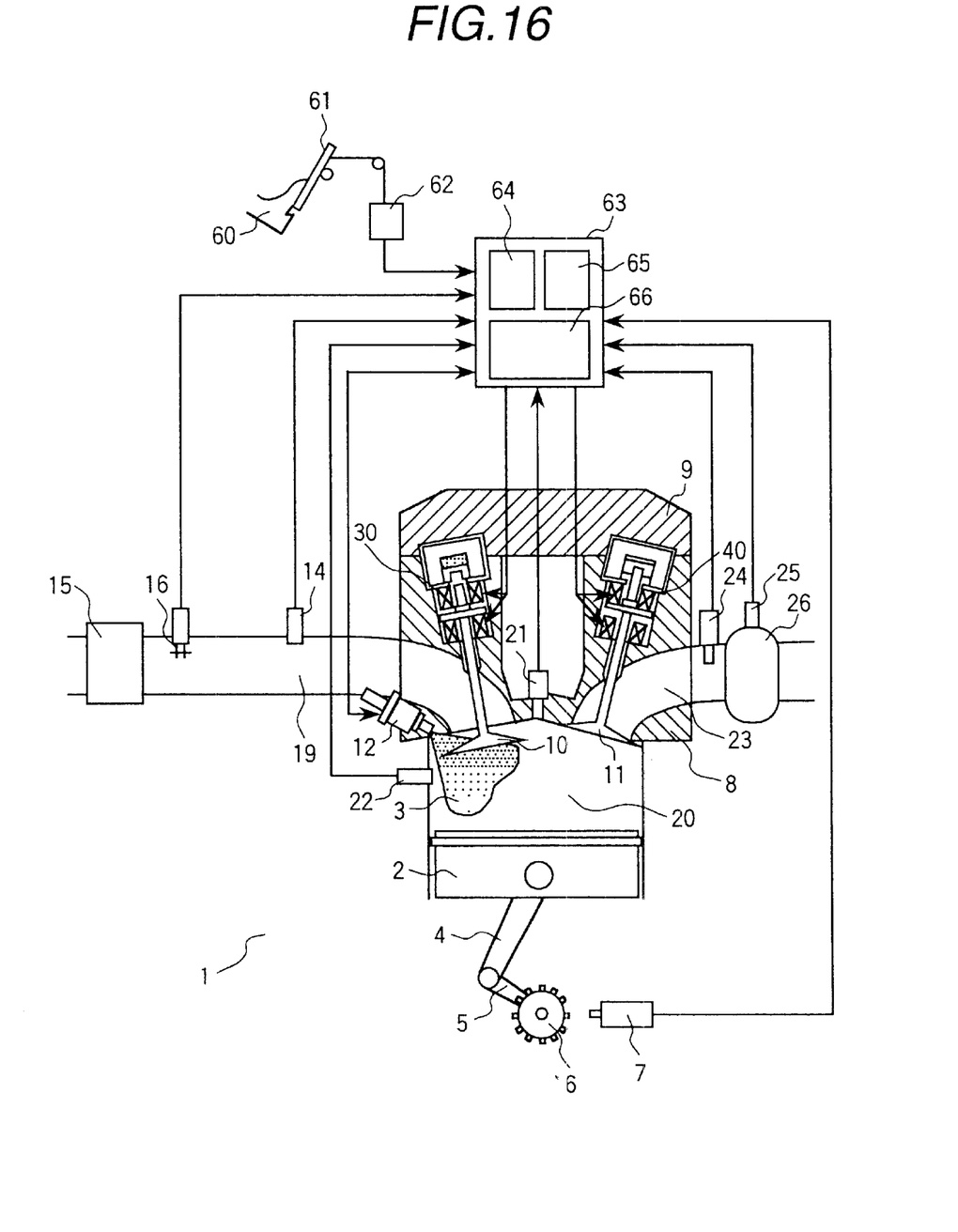
FIG. 16 is a diagram showing the system of a direct injection engine of side injection type to which the present invention is applied.
Figure 17:
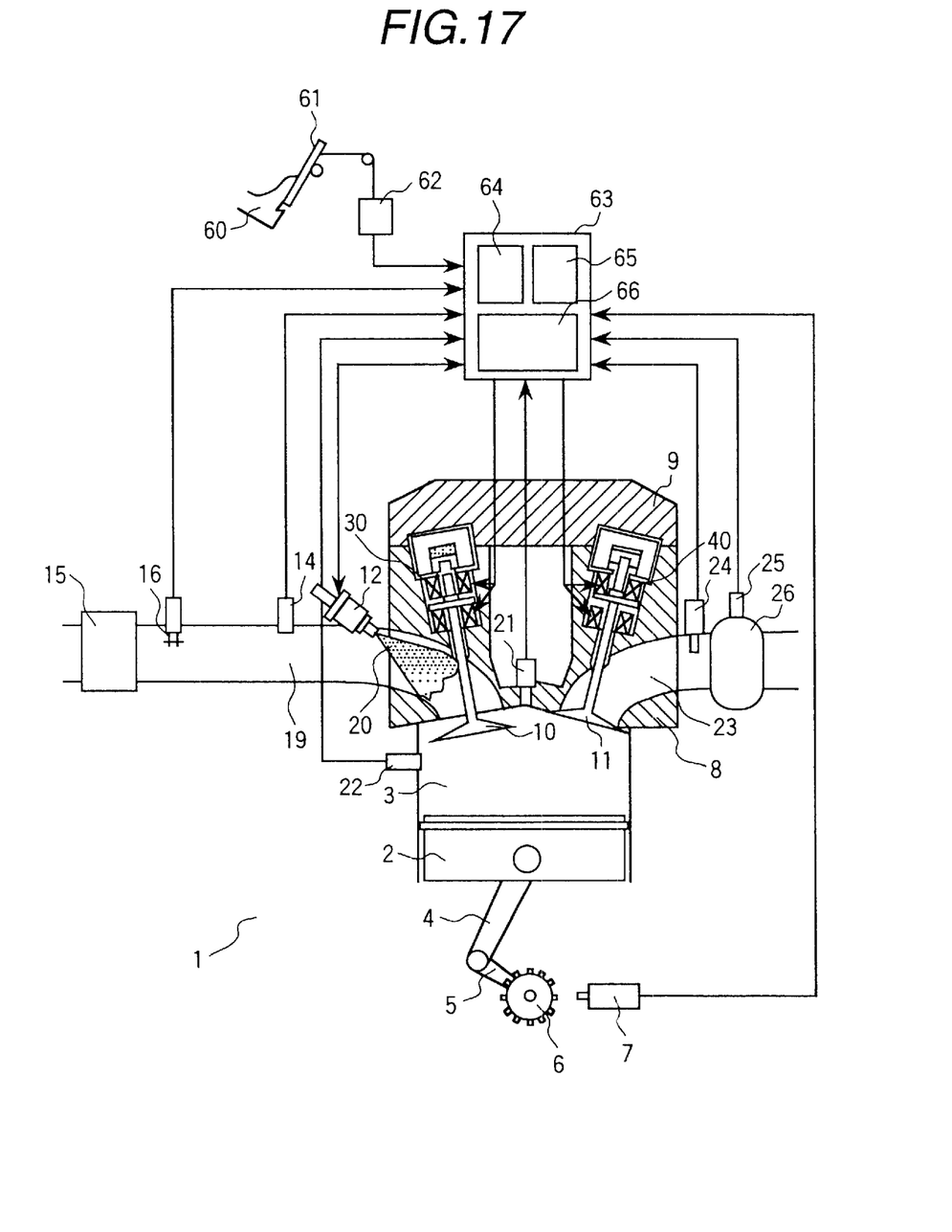
FIG. 17 is a diagram showing the system of an engine of port injection type to which the present invention is applied.

Although the fuel injector 12 is arranged in the center of the combustion chamber in the above-mentioned embodiments, the fuel injector may be arranged in the side of the combustion chamber 3 as shown in FIG. 16. Further, the present invention can be applied to an engine of MPI type as shown in FIG. 17, that is, to an engine in which fuel is not injected directly into the cylinder but the fuel is injected into the intake port.

Further, by detecting a deteriorated condition of the catalyzer 26 from the air-to-fuel ratio sensor 24 and the exhaust temperature sensor 25, the opening and the closing timings of the intake valve and/or the exhaust valve, the fuel injection timing or the amount of fuel injection may be corrected and controlled based on the information so that appropriate cleaning operation of the catalyzer can be obtained.

Furthermore, the present embodiment is characterized by that the intake passage 19 has no throttle valve for controlling intake air flow rate. In the present embodiment, an amount of air introduced into each of the cylinders is directly controlled by controlling the opening and the closing timings of the intake valve 10 corresponding to a stepping amount of the acceleration pedal 61. Therefore, different from the conventional engine, there is no pumping loss of air flow from the throttle valve for measuring the flow rate to the cylinder through the passage. Thereby, the ignition control can be performed more accurately than the conventional compression ignition, and the fuel efficiency can be improved by the eliminated pumping loss, and the output characteristic can be improved.

Further, the first embodiment is characterized by that the fuel injector 12 is arranged in the middle of the head portion of the cylinder. This feature comes from that the conventional spark plug is unnecessary in the compression ignition and the fuel injector can be directly placed in the portion where the spark plug has been attached. By this construction, the fuel efficiency can be improved because the fuel can be uniformly sprayed inside the cylinder and consequently ignition occurs inside the whole cylinder uniformly.

In the second embodiment, the fuel spray is diffused and distributed inside the cylinder in a state suitable for combustion by a swirl or a tumble flow generated in the cylinder by the air flow introduced into through the intake port.

In the second and third embodiments of FIG. 16 and FIG. 17, by arranging the pressure sensor 21 in the center of the head of the cylinder, an optimized value of pressure distribution in the cylinder can be measured.

Since the compression-ignition internal combustion engine in accordance with the present invention can control the compression pressure using the operating (variable valve) mechanism corresponding to operating condition of the engine, the ignition timing can be appropriately controlled corresponding to the operating condition of the engine.

Further, by using the present invention, the ignition timing can be made appropriate even if the air-to-fuel ratio and the engine rotating number are changed, and the torque change caused by change in atmospheric state can be corrected, and consequently it is possible to attain an additional effect that stable compression-ignition combustion can be realized.

What is claimed is:

1. A compression-ignition internal combustion engine comprising a valve mechanism having a valve arranged at one of an intake port and an exhaust port of a combustion chamber of said internal combustion engine to control opening-and-closing timing of the intake port or the exhaust port; a fuel injector for supplying fuel to a combustion chamber surrounded by said cylinder and a piston; an operating condition device to detect an operating condition of said internal combustion engine, wherein a mixture of the fuel injected from said fuel injector and air sucked into said combustion chamber is ignited by compression action by reciprocal motion of said piston, and an ignition timing control unit for controlling pressure inside said combustion chamber to regulate self-ignition timing of said engine by controlling the opening-and-closing timing with said valve mechanism corresponding to said detected operating condition.

2. A compression-ignition internal combustion engine according to claim 1, wherein
said fuel injector is arranged in a position around top center of said combustion chamber.

3. A compression-ignition internal combustion engine according to claim 1, wherein
said fuel injector is arranged in a position on a side part of said combustion chamber.

4. A compression-ignition internal combustion engine according to claim 1, wherein
said fuel injector is arranged in an intake passage located upstream of said intake valve.

5. A valve mechanism control device for a compression-ignition internal combustion engine having a valve mechanism including an intake valve and an exhaust valve arranged in a cylinder of said internal combustion engine; and a fuel injector for supplying fuel to a combustion chamber surrounded by said cylinder and a piston, wherein a mixture of the fuel injected from said fuel injector and air sucked into said combustion chamber is ignited by compression action through reciprocal motion of said piston, said valve mechanism control device being configured to control auto-ignition timing with at least one of opening timing and closing timing of at least said intake valve and said exhaust valve based on at least an air-to-fuel ratio so that the ignition occurs at an appropriate timing.

6. A valve mechanism control device for a compression-ignition internal combustion engine having a valve mechanism including at least one intake valve and at least one exhaust valve arranged in a cylinder of said internal combustion engine; and a fuel injector having injection holes directed toward a combustion chamber surrounded by a piston and a cylinder wall of said internal combustion engine, wherein a mixture of the fuel injected from said fuel injector and air sucked into said combustion chamber is ignited by compression action through reciprocal motion of said piston, said valve control device being configured to control auto-ignition timing with at least one of opening timing and closing timing of the at least intake valve and exhaust valve based on at least a rotating speed of said internal combustion engine so that the ignition occurs at an appropriate timing.

7. A valve mechanism control device for a compression-ignition internal combustion engine having a valve mechanism including at least one intake valve and at least one exhaust valve arranged in a cylinder of said internal combustion engine; and a fuel injector for supplying fuel to a combustion chamber surrounded by said cylinder and a piston, wherein a mixture of the fuel injected from said fuel injector and air sucked into said combustion chamber is ignited by compression action through reciprocal motion of said piston, said valve control device being configured to control auto-ignition timing with at least one of opening timing and closing timing of the at least one intake valve and exhaust valve based on at least an atmospheric pressure so that the ignition occurs at an appropriate timing.

8. A valve mechanism control device for a compression-ignition internal combustion engine having a valve mechanism including at least one intake valve and at least one exhaust valve arranged in a cylinder of said internal combustion engine; and a fuel injector for supplying fuel to a combustion chamber surrounded by said cylinder and a piston, wherein a mixture of the fuel injected from said fuel injector and air sucked inside said combustion chamber is ignited by compression action through reciprocal motion of a piston, said valve control device being configured to control auto-ignition timing with at least one of opening timing and closing timing of said at least one intake valve and exhaust valve based on at least an intake temperature so that the ignition occurs at an appropriate timing.

9. A valve mechanism control device for a compression-ignition internal combustion engine having a valve mechanism including at least one intake valve and exhaust valve arranged in a cylinder of said internal combustion engine; and a fuel injector for supplying fuel to a combustion chamber surrounded by said cylinder and a piston, wherein a mixture of the fuel injected from said fuel injector and air sucked into said combustion chamber is ignited by compression action through reciprocal motion of said piston, and controlling auto-ignition timing with at least one of opening timing and closing timing of said at least one intake valve and exhaust valve minimize a difference between the actual ignition timing and a target ignition timing.

10. A valve mechanism control device for a compression-ignition internal combustion engine having a valve mechanism including at least one intake valve and at least one exhaust valve arranged in a cylinder of said internal combustion engine; and a fuel injector for supplying fuel to a combustion chamber surrounded by said cylinder and a piston, wherein a mixture of the fuel injected from said fuel injector and air sucked into said combustion chamber is ignited by compression action through reciprocal motion of said piston, said valve control device being configured to control auto-ignition timing with at least one of opening timing and closing exhaust timing of said at least one intake valve and exhaust valve so that a maximum point of a cylinder pressure falls within 20 degrees after top dead center.

* * * * *